United States Patent Office
3,753,983
Patented Aug. 21, 1973

3,753,983
PIPERAZINE DERIVATIVES AND PROCESSES
FOR THEIR MANUFACTURE
Thomas Raabe, Heusenstamm, Klaus Resag and Rolf-Eberhard Nitz, Frankfurt am Main-Fechenheim, Germany, assignors to Cassella Farbwerke Mainkur Aktiengesellschaft, Frankfurt, Germany
No Drawing. Filed Apr. 27, 1971, Ser. No. 137,966
Claims priority, application Germany, May 2, 1970,
P 20 21 470.4
Int. Cl. C07d 51/70
U.S. Cl. 260—240 J                3 Claims

ABSTRACT OF THE DISCLOSURE

The present invention relates to new, pharmacologically valuable piperazine derivatives of the general formula

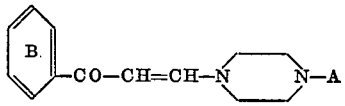

wherein

A means an alkyl or hydroxyalkyl radical having from 1 to 4 carbon atoms in the alkyl moieties, a benzhydryl or phenyl radical or one of the groups —COOR or

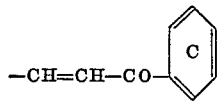

whereby R represents an alkyl group having from 1 to 4 carbon atoms and the benzene rings B and/or C may be substituted by halogen, an alkyl and/or alkoxy group having each from 1 to 4 carbon atoms, and/or by a nitro group and to the production of such derivatives by reacting a compound of the general formula

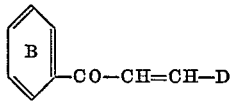

wherein D means ONa, OK, O-alkyl, OH, Cl or Br and wherein the benzene ring may be substituted as indicated above with a piperazine compound of the general formula

wherein A has the meaning given above, or by reacting, at a molar ratio of 2:1, a compound of the general formula

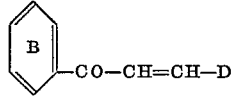

wherein D means ONa, OK, O-alkyl, OH, Cl or Br and wherein the benzene ring may be substituted as indicated above with piperazine, or by reacting a compound of the general formula

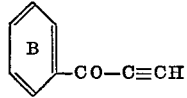

wherein the benzene ring may be substituted as indicated above with a compound of the general formula

wherein A has the meaning given above, or by reacting, at a molar ratio of 2:1, a compound of the general forumla

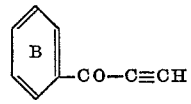

wherein the benzene ring may be substituted as indicated above with piperazine.

The present invention relates to new, pharmacologically valuable piperazine derivatives of the general formula

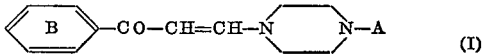

wherein

A means an alkyl or hydroxyalkyl radical having from 1 to 4 carbon atoms in the alkyl moieties, a benzhydryl or phenyl radical or one of the groups —COOR or

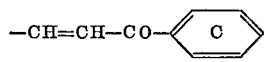

whereby

R represents an alkyl group having from 1 to 4 carbon atoms and the benzene rings B and/or C may be substituted by halogen, in particular chlorine or fluorine, and/or by a nitro group and/or alkyl and/or alkoxy groups having each from 1 to 4 carbon atoms.

The compounds of the present invention may be prepared for instance by the following reactions, whereby the benzene rings B and/or C may be substituted, as already mentioned, and A has the above-given meaning:

(a)

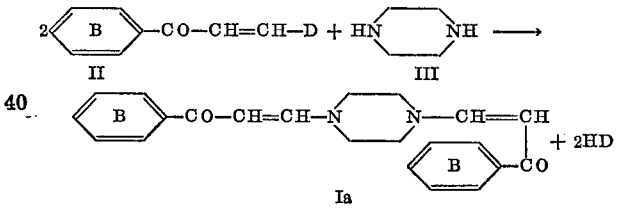

(b)

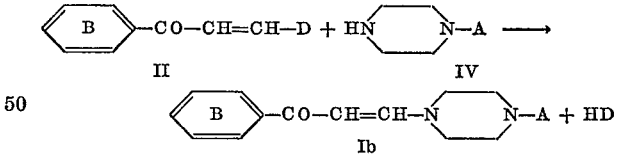

In the General Formula II D stands for ONa or OK, OH, O-alkyl, Cl or Br. The reactions are preferably carried out in a suitable solvent such as ethanol, wherein the initial products are dissolved or suspended. The compounds of the Formulae III and IV may also be employed in the form of their salts, for instance in the form of their hydrochlorides or dihydrochlorides. In the reaction of the sodium or potassium salts of the benzoylvinyl alcohols (D=ONa or OK in Formula II) with salts of the piperazine or of the compounds IV it is advisable to add a small amount of an acid such as hydrochloric acid, sulfuric acid, acetic acid or formic acid, so as to facilitate the reaction. If the sodium or potassium salts of the benzoylvinyl alcohols are reacted with piperazine or with the free compounds IV, molar amounts of acids are added with a small excess. If benzoylvinyl chlorides or bromides (D=Cl or Br in Formula II) are employed as starting material, hydrogen chloride or bromide splits off during the reaction which is preferably neutralized by the addition of molar amounts of a tertiary base such as triethylamine. If in the reactions (a) and (b) 2 mols of piperazine or of the compound IV are employed such addition of the tertiary base is unnecessary. In the reaction (a) according to which 2 mols of the compound II are reacted with one mol of the compound III one obtains the compounds Ia of the present invention which contain 2 unsubstituted or 2 identically substituted benzoylvinyl radicals. According to the reaction (b) and if A stands for the group

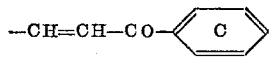

it is also possible to obtain compounds having the general formula

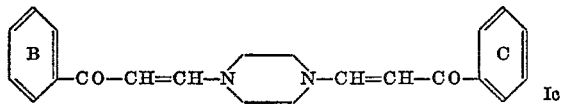

the benzene rings B and C being substituted in different ways.

As far as the initial products II and IV are unknown they may be prepared according to different known per se methods. In the case of the compounds II, the sodium or potassium salts of the benzoylvinyl alcohols for example are easily obtained by an alkaline ester condensation of an acetophenone which may be substituted at the benzene ring, with a formic acid ester. Thus it is possible to subject the following acetophenones to an alkaline ester condensation with methyl or ethyl formate:

4-butyl-acetophenone
4-propyl-acetophenone
2-methyl-acetophenone
4-butoxy-acetophenone
2-chloro-acetophenone
2,5-dichloro-acetophenone
3,4-dichloro-acetophenone
2,3,4-trichloro-acetophenone
2,4,5-trichloro-acetophenone
2,4-dimethyl-acetopenone
2,6-dimethyl-acetophenone
2,5-dimethyl-acetophenone
3-chloro-4-methyl-acetophenone
2-methyl-4-ethyl-acetophenone
2,4,6-trimethyl-acetophenone
2,4,5-trimethyl-acetophenone It is possible to prepare by way of hydrolysis from the sodium or potassium salts of the benzoylvinyl alcohols the benzoylvinyl alcohols which may be converted into the benzoylvinyl chlorides or bromides by way of a reaction with suitable chlorination or bromination agents such as thionylchloride, phosphorus trichloride or phosphorus tribromide.

The benzoylvinyl alkyl ethers may be obtained for instance by alkylation of the sodium or potassium salts of the benzoylvinyl alcohols or by reaction of the benzoylvinyl chlorides or bromides with alcohols.

It is also possible to prepare the benzoylvinyl chlorides by addition of correspondingly substituted benzoylchlorides to acetylene or to vinylchloride with the subsequent splitting off of hydrochloric acid. The benzoylvinyl bromides are obtained analogously.

Piperazine compounds IV wherein A stands for alkyl, hydroxyalkyl, benzhydryl, phenyl or alkoxycarbonyl (—COOR) are known. Suitable known piperazine compounds IV are for instance:

N-ethyl-piperazine
N-propyl-piperazine
N-isopropyl-piperazine
N-(3-hydroxypropyl)-piperazine
N-(2-hydroxypropyl)-piperazine
N-(4-hydroxybutyl)-piperazine
N-carbpropoxy-piperazine Piperazine compounds IV wherein A stands for

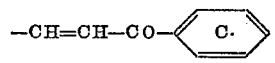

are obtained by reacting a compound of the formula

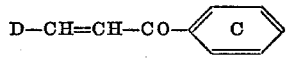   V wherein D stands for ONa, OK, OH, O-alkyl, Cl or Br and which may be prepared analogously to the compound II, either with a large excess of piperazine or with a piperazine one nitrogen atom of which is protected by a protective group such as a formyl or alkoxycarbonyl group which is eliminated after the reaction.

Moreover the compounds of the general Formula I of the present invention may be obtained by addition of piperazine of substituted piperazines to possibly substituted propiolophenones VI:

(c)

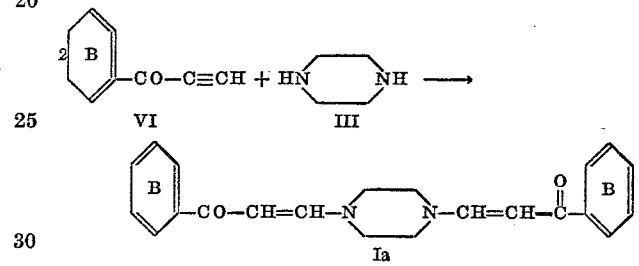

(d)

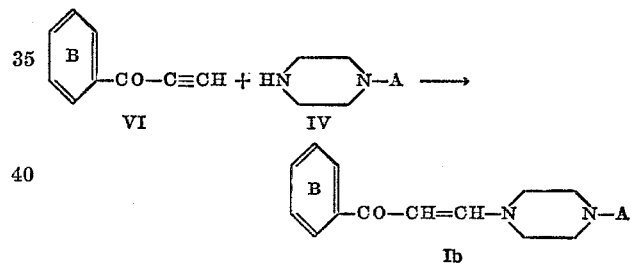

The compounds of the General Formula Ic of the present invention which are obtained according to the reaction (b) are also obtainable according to the reaction (d). The reactions (c) and (d) are carried out in a suitable solvent such as ether.

The piperazine derivatives of the present invention are valuable pharmaceuticals. Thus they possess for instance distinct anorectic properties and are superior to other known anorectics.

Unlike the known anorectics which are accused of causing a pulmonary arterial hypertension, the compounds of the present invention involve, as is shown by a pharmacological investigation carried out in narcotized, artificially respired dogs with injection solutions 1–5 mg./kg., no increase at all or only a slight increase in the tension in the pulmonary artery.

The piperazine derivatives of the present invention and their pharmaceutically acceptable salts may be employed in the preparation of pharmaceutical formulations such as tablets, dragées, suppositories, capsules, solutions, suspensions or emulsions. The pharmaceutical formulations may also contain other therapeutically valuable ingredients Tablets with a content of 5 to 80% by weight of essential active ingredient may be prepared with the conventional solid tabletting adjuvants such as lactose, wheat starch, microcrystalline starch, gelatin, talc, stearic acid, magnesium stearate and the like.

The following examples are given for the purpose of illustrating the present invention. All temperatures are given in degrees centigrade.

EXAMPLE 1

4.3 g. anhydrous piperazine are dissolved in 40 cc. methylene chloride 16.2 g. ω-methoxyacrylophenone ($C_6H_5.CO.CH:CH.OCH_3$)

are added and the mixture is heated during 3 hours under reflux. Subsequently, the solution is concentrated in vacuo. After a while the residue solidifies. By recrystallizing from dimethylformamide which has been diluted with water one obtains the N,N′-dibenzoylvinyl-piperazine melting at 231–233°.

($C_{22}H_{22}N_2O_2$.—Calc. (percent): N, 8.1. Found (percent): 7.8.) Yield: 11 g.=63.5% of the theoretical.

The ω-methoxyacrylophenone required as starting material may be prepared by reacting the sodium salt of the benzoylvinyl alcohol with methyl iodide.

The N,N′-dibenzoylvinyl-piperazine is also obtained with a good yield by reacting an etheric solution of 0.05 mol piperazine with an etheric solution of 0.1 mol propiolophenone.

EXAMPLE 2

4 g. sodium salt of the p-methoxybenzoylvinyl alcohol ($CH_3O.C_6H_4.CO.CH:CH.ONa$) and 4.45 g. N-butoxycarbonylpiperazine hydrochloride are suspended in 20 cc. ethanol, one drop of formate is added and the suspension is stirred for 24 hours at room temperature. Subsequently, the reaction mixture is sucked off and the residue is washed with ethanol. The alcohol filtrate is concentrated in vacuo and the residue is washed several times with water. After recrystallizing from dilute ethanol one obtains the N-butoxycarbonyl-N′-p-methoxybenzoylvinyl - piperazine melting at 99–102°.

($C_{19}H_{26}N_2O_4$.—Calc. (percent): N, 8.1. Found (percent): 8.1.) Yield: 4.1 g.=51.8% of the theoretical.

The sodium salt of the p-methoxybenzoylvinyl alcohol required as starting material may be prepared as follows:

5.4 g. sodium methylate are suspended in 25 cc. anhydrous benzene. Subsequently, while stirring and cooling with ice during 30 minutes a mixture consisting of 15.1 g. p-methoxyacetophenone, dissolved in 30 cc. anhydrous ether and 8 g. ethyl formate is added. This mixture is stirred for another 2 hours, then it is allowed to stand for 20 hours at room temperature. After sucking off and washing the residue with anhydrous ether and anhydrous ethanol and drying in vacuo one obtains the sodium salt of the p-methoxybenzoylvinyl alcohol. Yield: 16.5 g.= 83% of the theoretical.

EXAMPLE 3

6.32 g. N-ethoxycarbonyl-piperazine are dissolved in 40 cc. anhydrous toluene. Subsequently, while cooling with ice, 4.02 g. p-chlorobenzoylvinyl chloride, dissolved in little anhydrous toluene, are slowly added, stirring is continued with ice cooling and the mixture is allowed to stand for a good while at room temperature. A water-soluble residue is then sucked off and the toluene filtrate is concentrated in vacuo. The partially oily product is dissolved in methylene chloride washed with water, with 0.2 n-hydrochloric acid and again with water, dried over sodium sulfate and concentrated.

The remaining product is treated with acetic ester/petroleum ether. Thus obtained is the N-ethoxycarbonyl-N′-p-chlorobenzoylvinyl-piperazine melting at 139–140°.

($C_{16}H_{19}ClN_2O_3$.—Calc. (percent): N, 8.7. Found (percent): 8.7.) Yield: 2.5 g.=39% of the theoretical.

The p-chlorobenzoylvinyl chloride required as starting material may also be obtained with a good yield from p-chlorobenzoylvinyl alcohol with thionylchloride in benzene.

Analogously to the descriptions given in Examples 1–3 the following compounds of the present invention may be prepared:

| $R_1$ | $R_2$ | A | Melting point, °C |
|---|---|---|---|
| F | H | —CH=CH—CO—⟨C₆H₄⟩—F | 259 |
| Cl | H | —CH=CH—CO—⟨C₆H₄⟩—Cl | 284 |
| $CH_3$ | H | —CH=CH—CO—⟨C₆H₄⟩—$CH_3$ | 216 |
| F | H | —$COOC_2H_5$ | 102 |
| $OCH_3$ | H | —CH=CH—CO—⟨C₆H₄⟩—$OCH_3$ | 129 |
| H | H | —$COOC_2H_5$ | 93 |
| $C_2H_5$ | H | —$COOCH_3$ | ca.[1] 50 |
| $CH_3$ | H | —$CH_3$ | ca.[1] 60 |
| H | H | —$C_4H_9$ | ca.[1] 65 |
| $OCH_3$ | H | —$CH_2$—$CH_2$—OH | 55 |
| $C_2H_5$ | H | —CH(⟨C₆H₅⟩)(⟨C₆H₅⟩) | [1] 72 |
| $OCH_3$ | H | —⟨C₆H₅⟩ | 113 |
| H | $NO_2$ | —$COOC_2H_5$ | 190 |

[1] Decomposition (hydrochloride).

What we claim is:
1. Piperazine derivative of the general formula

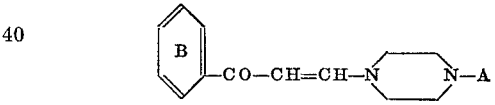

wherein A means an alkyl or hydroxyalkyl radical having from 1 to 4 carbon atoms in the alkyl moieties, a benzhydryl or phenyl radical or one of the groups —COOR or

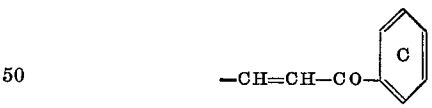

whereby R represents an alkyl group having from 1 to 4 carbon atoms and the benzene rings B and/or C may be substituted by halogen, an alkyl and/or alkoxy group having each from 1 to 4 carbon atoms, and/or by a nitro group, or the hydrochlorides of said derivatives.

2. Piperazine derivative according to claim 1 characterized in that the benzene ring B and/or C is substituted by a chlorine or a fluorine atom.

3. N,N′-dibenzoylvinyl-piperazine, or the hydrochloride derivatives thereof.

References Cited
UNITED STATES PATENTS 2,882,271   4/1959   Janssen _____ 260—240 J

OTHER REFERENCES

Kostka: Chemical Abstracts, vol. 66, Abstract No. 94776 (1967).

JOHN D. RANDOLPH, Primary Examiner

U.S. Cl. X.R.

260—591; 424—250